United States Patent [19]
Kaelin

[11] 3,827,679
[45] Aug. 6, 1974

[54] METHOD OF INTRODUCING OXYGEN INTO A LIQUID TO BE CLARIFIED AND DEVICE FOR CARRYING THE METHOD INTO EFFECT

[76] Inventor: Joseph Richard Kaelin, Villa Seeburg, CH-6374 Buochs, Switzerland

[22] Filed: Aug. 14, 1972

[21] Appl. No.: 280,478

[30] Foreign Application Priority Data
Aug. 13, 1971 Switzerland.................... 11974/71

[52] U.S. Cl..................... 261/91, 210/15, 210/219, 261/93
[51] Int. Cl............................ B01f 3/04, C02c 5/04
[58] Field of Search...................... 210/15, 218–221; 261/76–78, 83, 84, 91, 93, 124, 126, 87

[56] References Cited
UNITED STATES PATENTS

| | | | |
|---|---|---|---|
| 2,296,437 | 9/1942 | Green............................ | 210/220 X |
| 2,554,492 | 5/1951 | Hartman et al................. | 210/219 X |
| 3,278,170 | 10/1966 | Moritz........................ | 261/93 X |
| 3,498,459 | 3/1970 | Bohnke........................ | 210/220 X |
| 3,704,009 | 11/1972 | Halbskopf..................... | 210/219 X |

*Primary Examiner*—Charles N. Hart
*Assistant Examiner*—Robert H. Spitzer

[57] ABSTRACT

Method of introducing oxygen into a liquid located in an activation tank of a clarification plant. The liquid is made to circulate in toroidal flows and oxygen or air is bubbled through.

4 Claims, 3 Drawing Figures

3,827,679

METHOD OF INTRODUCING OXYGEN INTO A LIQUID TO BE CLARIFIED AND DEVICE FOR CARRYING THE METHOD INTO EFFECT

The invention relates to a method of introducing oxygen into liquid located in an activation tank of a clarification plant, and a device for carrying the method into effect.

It is already known to ventilate the liquid located in an activation tank of a clarification plant by means of a ventilation gyroscope commonly called a ventilation gyro. When using particularly deep activation tanks the liquid located in the lower part of the activation tank may, when using this method, be inadequately supplied with oxygen and sludge deposits may occur.

It is also already known in the case of deep activation tanks to provide compression ventilation acting below the level of the liquid. As in the other known arrangements the air bubbles rise vertically upwards through the liquid in a substantially linear path, and the time the air bubbles remain in the liquid to be ventilated is not sufficient for their entire oxygen content to be transferred to the liquid. Furthermore in the case of intermittent operation difficulties arise insofar as with only compression ventilation the sludge depositing in the stationary period can no longer be conveyed upwards, with the result that in time the air nozzles become blocked and the entire compression ventilation means must be removed from the tank for cleaning.

A further disadvantage in the known devices of this kind is that when using deep activation tanks, the liquid located in the bottom part of the latter is circulated inadequately if at all.

An object of the present invention is to provide a method which obviates the aforementioned disadvantages.

According to the invention there is provided a method of introducing oxygen into the liquid located in an activation tank of a clarification plant, wherein at least one substantially toroidal liquid flow circulating in the lower part of the activation tank and at least one such flow circulating in the upper part of the said tank are produced, the common axis of symmetry of which toroidal flow runs at least substantially vertically, and that oxygen or an oxygen mixture is added to each of the toroidal flow circuits at at least one point in each case.

Further according to the invention there is provided a device for carrying out the method of the invention comprising circulating means arranged in an activation tank for producing at least one substantially toroidal liquid flow circulating in the lower part of the activation tank and at least one such flow in the upper part of the said tank and supply means for supplying oxygen or an oxygen mixture to the individual toroidal liquid flows.

It is expedient if the upper substantially toroidal liquid flow is produced by means of a gyro projecting from the liquid, which serves at the same time as a surface ventilator, and if oxygen or an oxygen mixture is supplied to the lower toroidal liquid flows by way of a feed pipe.

To obtain an improved flow it is advantageous if the substantially toroidal flow circuit are diverted into the desired direction by means of flow deflecting means arranged in the activation tank.

In order to obtain uniform mixing of the freshly supplied liquid to be purified with the liquid already located in the activation tank, it is expedient if the liquid to be purified is introduced into the activation tank at the level of the plane of separation between two substantially toroidal flow circuits.

A further object of the invention is a device for carrying the method according to the invention into effect, which is characterised in that it comprises circulating means arranged in the activation tank for producing at least one substantially toroidal liquid flow circulating in the lower part of the activation tank and at least one such flow in the upper part of the said tank and supply means for supplying oxygen or an oxygen mixture to the individual toroidal liquid flows.

It is expedient if it comprises a ventilation gyro for producing the upper substantially toroidal liquid flow and for introducing oxygen into the said flow, which gyro is arranged in the activation tank in such a manner that during operation of the device the outlet apertures of the ventilation gyro are located above the level of the liquid.

It is advantageous if in the lower part of the activation tank there is arranged a liquid conveying means for producing the lower toroidal flow circuit.

It is expedient if the liquid conveying means arranged in the lower part of the activation tank is provided with adjustable blades for varying the quantity conveyed.

It is moreover advantageous if the ventilation gryo is connected by way of vertically extending shaft to a liquid conveying means for producing the lower toroidal flow circuit arranged in the lower part of the activation tank, and if the vertically extending shaft is connected at its lower end to a second liquid conveying means, which is preferably variable in delivery, for conveying activated sludge arriving from a reclarification tank into the flow circuit to be produced in the lower part of the activation tank. At the same time it is expedient if a rotationally (axially) symmetrical flow deflecting part is arranged on the shaft at the level of the plane of separation between two flow circuits to be produced and is designed in such a manner that the upper flow circuit is deflected by the said part towards the shaft in the upwards direction and the lower flow circuit is deflected by the said part towards the shaft in the downward direction.

The invention will be explained hereunder by way of example with reference to the drawings. In the drawings.

Figure 1:
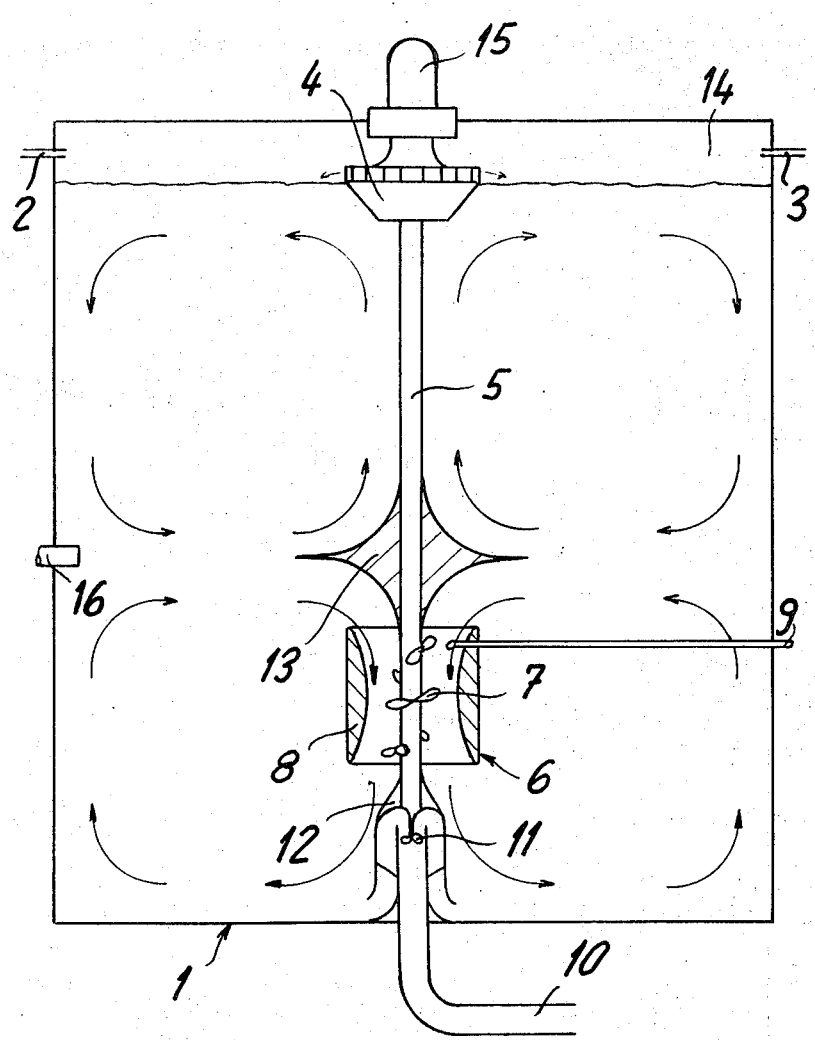
FIG. 1 is a section through a first embodiment of the invention.

In FIG. 1 there is shown a section through an activation tank 1 of a clarification plant, in which are provided circulating means or gyro 4 and liquid conveying means 6 for producing one substantially toroidal flow circulating in the lower part of the activation tank 1 and one such flow in the upper part of the said tank and supply means for supplying pure oxygen or an oxygen mixture, such as for example air, to the individual flow circuit.

For producing the upper flow circuit and for introducing oxygen or oxygen-containing air into same there is provided a ventilation gyro 4, which is arranged in the activation tank in such a manner that during operation of the device, the outlet apertures of the ventilation gyro 4 are located above the liquid level and in this way as many liquid particles as possible come into contact with the air or oxygen located above the liquid level.

The ventilation gyro 4 is connected by means of a vertically extending shaft 5 to a liquid conveying means 6 for producing the lower flow circuit arranged in the lower part of the activation tank 1.

The liquid conveying means 6 consists of blades 7 arranged adjustably on the shaft 5, which are surrounded by a cylindrical annular part 8, so that the liquid is conveyed in the axial direction downwardly along the shaft 5. The feed pipe 9 serves to supply pure oxygen or an oxygen mixture, such as for example air, to the range of operation of the liquid conveying means 6.

The vertically extending shaft 5 is connected at its lower end to a conveyor worm 11 having adjustable blades projecting into a feed pipe 10, which worm serves to convey activated sludge arriving from a reclarification tank into a flow circuit to be produced in the lower part of the activation tank 1. As the blades of the conveyor worm 11 are adjustable, for example, by means of a servo motor, the desired quantity of reflux sludge can be exactly adjusted. Further there is fixed to the lower end of the shaft 5 a deflecting part 12, which surrounds the feed pipe 10 and deflects the activated sludge discharged from the latter through 180° and introduces it into the lower flow circuit. The outside of the deflecting part 12 is designed so as to promote flow, in order to offer as little as possible flow resistance to the liquid discharged from the liquid conveying means 6.

On the shaft 5 there is arranged at the level of the imaginery plane of separation located between the two flow circuits a rotationally symmetrical flow deflecting part 13 which is so designed that the upper flow circuit is deflected by the said deflecting part 13 towards the shaft 5 in the upward direction and the lower flow circuit is deflected by same towards the shaft 5 in the downward direction. Naturally additional flow deflecting parts may also be arranged in the interior of the activation tank 1.

The axially symmetrically arranged ventilation gyro 4 causes a slight rotation of the liquid located in the activation tank 1 at a speed of approximately 25–30 cm/sec., and effects together with the two flow circuits a delayed rising of the air introduced into the lower flow circuit via the feed pipe 9 as well as a relatively high flow velocity at the bottom of the activation tank 1. Naturally instead of air pure oxygen may also be used, whereby the oxygen feed per unit of time can be increased.

As in this way the individual air or oxygen bubbles remain longer in the liquid than hitherto, because they do not rise upwards in a substantially vertical direction, there is a greater feed of oxygen into the liquid than hitherto. Air and/or oxygen is conducted through the pipe 2 into the space 14, and thence by way of the ventilation gyro 4 into the liquid. The discharge pipe 3 serves to pass used air and other gases formed during the process.

If pure oxygen is used, the activation tank may be closed at the top, so that any oxygen discharged from the surface of the liquid into the space 14 is reintroduced into the liquid by means of the gyro 4.

In order to make maintenance of the device as simple as possible, the drive unit 15 connected to the ventilation gyro 5 together with the vertically downwardly extending shaft 5 and the blades 6 attached thereto of the liquid conveying means 6 and 11 is designed as one unit which can be be dismantled from above, so that this unit can be removed or exchanged without emptying the activation tank 1.

In order to obtain as uniform as possible distribution of the freshly supplied liquid to be purified with the liquid already located in the activation tank 1, the feed pipe 16 for supply of the liquid to be purified opens into the activation tank 1 at the level of the plane of separation between the two flow circuits to be produced in the activation tank 1.

Figure 2:
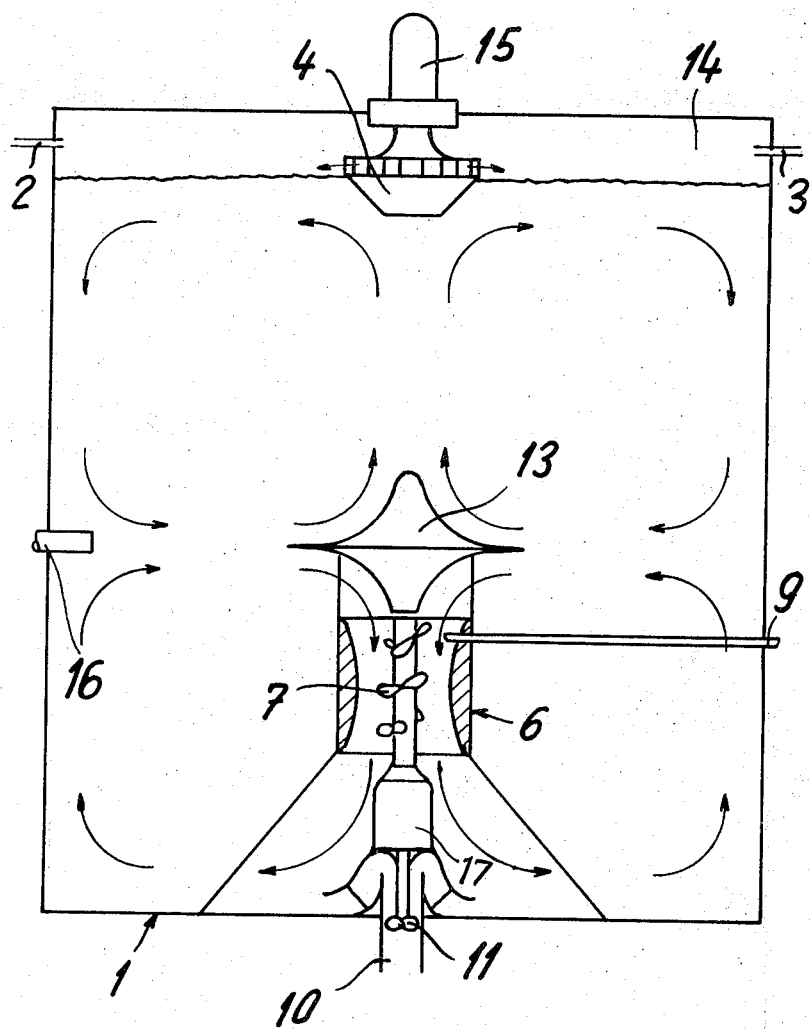
FIG. 2 is a section through a second embodiment of the invention.

The device shown in FIG. 2 differs from the device shown in FIG. 1 only by the feature that the liquid conveying means 6 and 11 are driven independently of the ventilation gyro 4 by an immersion motor 17. As a result the relatively long shaft 5 of the device shown in FIG. 1 is superfluous.

Figure 3:
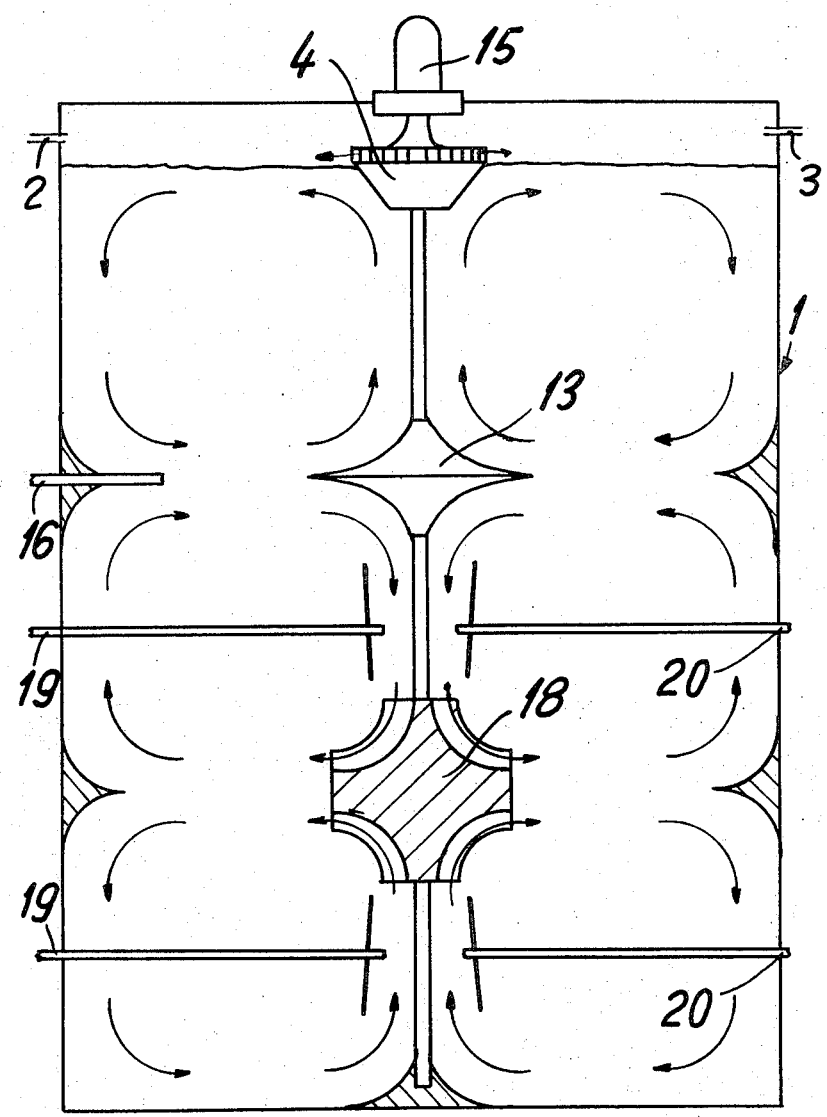
FIG. 3 is a section through a third embodiment of the invention.

In FIG. 3 there is shown a device in which three substantially toroidal circuits arranged one above the other are produced. In this case the second liquid conveying means used is a double-sided centrifugal pump impeller 18, in front of the suction apertures of which there is provided in each case one oxygen or air feed pipe 19 and one sludge reflux pipe 20.

According to requirements the circulating means may be arranged either in the tank axis or eccentrically.

I claim:

1. A device for introducing oxygen into a liquid, comprising circulating means arranged in an activation tank for producing at least one substantially toroidal liquid flow circulating in the lower part of the activation tank and at least one such flow in the upper part of the said tank and supply means for supplying oxygen or an oxygen mixture to the individual toroidal liquid flow, comprising a ventilation gyroscope having outlet apertures for producing the upper substantially toroidal liquid flow and for introducing oxygen into the said flow, which ventilation gyroscope is arranged in the activation tank in such a manner that during operation of the device the outlet apertures of the ventilation gyro are located above the level of the liquid, wherein in the lower part of the activation tank there is arranged a liquid conveying means for producing the lower toroidal flow circuit, wherein the ventilation gyro is connected by way of a vertically descending shaft to said liquid conveying means, wherein a rotationally symmetrical flow deflecting part is arranged on the shaft at the level of the plane of separation between two flow circuits to be produced and is designed in such a manner that the upper flow circuit is deflected by the said part towards the shaft in the upwards direction and the lower flow circuit is deflected by the said part towards the shaft in the downward direction.

2. A device for introducing oxygen into a liquid, comprising circulating means arranged in an activation tank for producing at least one substantially toroidal liquid flow circulating in the lower part of the activation tank and at least one such flow in the upper part of the activation tank and supply means for supplying oxygen or an oxygen mixture to the individual toroidal liquid flow, comprising a ventilation gyroscope having outlet apertures for producing the upper substantially toroidal liquid flow and for introducing oxygen into the said flow, which gyroscope is arranged in the activation tank in such a manner that during operation of the device the outlet apertures of the ventilation gyroscope are located above the level of the liquid, wherein in the lower part of the activation tank, there is arranged a liquid conveying means for producing the lower toroidal flow circuit, wherein the ventilation gyroscope is situated on a common vertical descending axis with said liquid conveying means, wherein a rotationally symmetrical flow deflecting part is arranged on said common axis at the level of the plane of separation between two flow circuits to be produced and is designed in such a manner that the upper flow circuit is deflected by the said part towards the said axis in the upwards direction and the lower flow circuit is deflected by the said part towards the said axis in the downward direction.

3. A method of introducing oxygen into a liquid located in an activation tank of a clarification plant, comprising the steps of forming at least one substantially toroidal liquid flow circulating in the lower part of the activation tank, forming at least one substantially toroidal liquid flow circulating in the upper part of the activation tank with a ventilation gyroscope projecting from the liquid and which ventilation gyroscope also serves as a surface ventilator, said toroidal liquid flows being arranged to lie above each other and to directly adjoin each other for providing a continuous exchange of the liquid between each other and having a substantially vertical common axis of symmetry, diverting the liquid flows into the desired position by means of flow deflecting means arranged in the activation tank, supplying oxygen or an oxygen mixture to at least one point of the lower toroidal flow circuit be means of a feed pipe and supplying oxygen or an oxygen mixture to at least one point in the upper toroidal liquid flow circuit.

4. A device for introducing oxygen into a liquid comprising, in combination, a ventilation gyroscope having outward apertures for producing at least one upper substantially toroidal flow circuit and for introducing oxygen into said flow, said ventilation gyroscope being arranged in the activation tank whereby the outward apertures are located above the level of the liquid, lower flow circuit means for producing a lower toroidal flow circuit in the lower part of the activation tank, said lower and upper toroidal flow circuits being arranged one above the other for providing a continuous exchange of the liquids between each other, flow deflecting means arranged in the interior of the activation tank for aiding in the production of said upper and lower toroidal flow circuits, at least one feed pipe for conveying activated sludge arriving from a reclarification tank into the lower toroidal flow circuit, and supply means for supplying oxygen or an oxygen mixture to said toroidal flow circuits.

* * * * *